(12) United States Patent
Borders

(10) Patent No.: US 6,763,779 B1
(45) Date of Patent: Jul. 20, 2004

(54) METHOD OF USING A REMOTE CONTROL LOCATOR

(76) Inventor: Robert Douglas Borders, 11046 Autillo Way, San Diego, CA (US) 92127

( * ) Notice: Subject to any disclaimer, the term of this patent is extended or adjusted under 35 U.S.C. 154(b) by 0 days.

(21) Appl. No.: 10/427,016

(22) Filed: Apr. 29, 2003

(51) Int. Cl.[7] .............................................. G09B 1/00
(52) U.S. Cl. ..................... 116/201; 116/209; 211/26.1
(58) Field of Search .............................. 116/201, 209, 116/278; 211/26.1

(56) References Cited

U.S. PATENT DOCUMENTS

| | | | | |
|---|---|---|---|---|
| 5,230,133 A | * | 7/1993 | Esposito ..................... | 116/201 |
| 5,460,347 A | * | 10/1995 | Schacher ................... | 211/26.1 |
| 5,632,385 A | * | 5/1997 | Mantey ..................... | 211/26.1 |
| 5,724,910 A | * | 3/1998 | Annesley et al. ........... | 116/209 |
| 5,945,918 A | * | 8/1999 | McGonigal et al. ... | 340/825.36 |
| 6,109,453 A | * | 8/2000 | Wilen ........................ | 211/26.1 |
| 6,425,496 B1 | * | 7/2002 | Schulein .................... | 116/201 |
| 6,445,290 B1 | * | 9/2002 | Fingal et al. .......... | 340/539.32 |

* cited by examiner

Primary Examiner—Christopher W. Fulton
Assistant Examiner—Amanda J Hoolahan
(74) Attorney, Agent, or Firm—Procopio Cory Hargreaves & Savitch

(57) ABSTRACT

A method of using a remote control locator with a remote control includes providing a remote control locator including a wing-shaped fluorescent body and a mounting assembly, the wing-shaped fluorescent body including a length L at least twice the width $W_r$ of the remote control and no greater than ten times the width $W_r$; and attaching the wing-shaped fluorescent body only to a top end portion of the remote control using the mounting assembly so that the wing-shaped fluorescent body is centered and extends laterally with respect to the remote control to form opposite lateral fluorescent wings.

12 Claims, 6 Drawing Sheets

METHOD OF USING A REMOTE CONTROL LOCATOR

FIELD OF THE INVENTION

The present invention is in the field of remote control locators for assisting a user in finding a lost remote control unit.

BACKGROUND OF THE INVENTION

Remote controls are used to wirelessly and remotely control televisions, stereos, VCRs, DVD players, and other electronic equipment. Because remote controls are small, thin and moved around by users frequently, there is a tendency for these devices to become periodically lost or misplaced. Searching for a lost remote control happens frequently, and is a frustrating and time-consuming experience. Often the remote control can not be found, and the user must either purchase a replacement remote control of the same type or a universal remote control. Remote control locators have been developed in the past. For example, beeping devices are placed on or integrated with the remote control. A separate transmitter or pager, which may be integrated with the electronic device (e.g., television) is activated, causing the beeping device on the lost remote control to beep, so the user can locate the lost remote control. In another remote control locator, a user whistles, and a detector on the remote control detects the whistle and beeps, so the user can locate the lost remote control. General problems with these devices are that they are relatively expensive and often do not work because the remote control is out of range or batteries associated with the locators do not have sufficient power.

SUMMARY OF THE INVENTION

Accordingly, an aspect of the invention involves an inexpensive, non-electronic remote control locator in the form of a bright, fluorescent wing-shaped attachment that attaches to an upper and top end portion of a remote control to help a user locate the remote control and prevent the remote control from falling into crevices or cracks in home furniture.

Another aspect of the invention involves a method of using a remote control locator with a remote control including a width $W_r$ and a top end portion. The method includes providing a remote control locator including a wing-shaped fluorescent body and a mounting assembly, the wing-shaped fluorescent body including a length L at least twice the width $W_r$ of the remote control and no greater than ten times the width $W_r$; and attaching the wing-shaped fluorescent body only to a top end portion of the remote control using the mounting assembly so that the wing-shaped fluorescent body is centered and extends laterally with respect to the remote control to form opposite lateral fluorescent wings.

A further aspect of the invention involves a method of using a remote control locator with a remote control including a width $W_R$ a top end portion, a rear, and opposite sides. The method includes providing a remote control locator including a wing-shaped fluorescent body carrying advertising and a mounting assembly, the wingshaped shaped fluorescent body including a front surface with a central portion and a length L at least twice the width $W_R$ of the remote control and no greater than ten times the width $W_R$, the mounting assembly including a remote control fastener strip and a body fastener strip, one of the strips including hook fasteners and the other strip including loop fasteners; adhering the remote control fastener strip to the rear and opposite sides of the remote control in the top end portion; adhering the body fastener strip to the central portion of the upper face of the wing-shaped body; attaching the wing-shaped fluorescent body only to the top end portion of the remote control by attaching the body fastener strip to the remote control fastener strip of the mounting assembly so that the wing-shaped fluorescent body is centered and extends laterally with respect to the remote control to form opposite lateral fluorescent wings; and advertising to a user of the remote control with the advertising carried by the wing-shaped fluorescent body.

Other features and advantages of the invention will be evident from reading the following detailed description, which is intended to illustrate, but not limit, the invention.

BRIEF DESCRIPTION OF THE DRAWINGS

The drawings illustrate the design and utility of preferred embodiments of the present invention, in which.

DETAILED DESCRIPTION OF PREFERRED EMBODIMENTS

Figure 1:
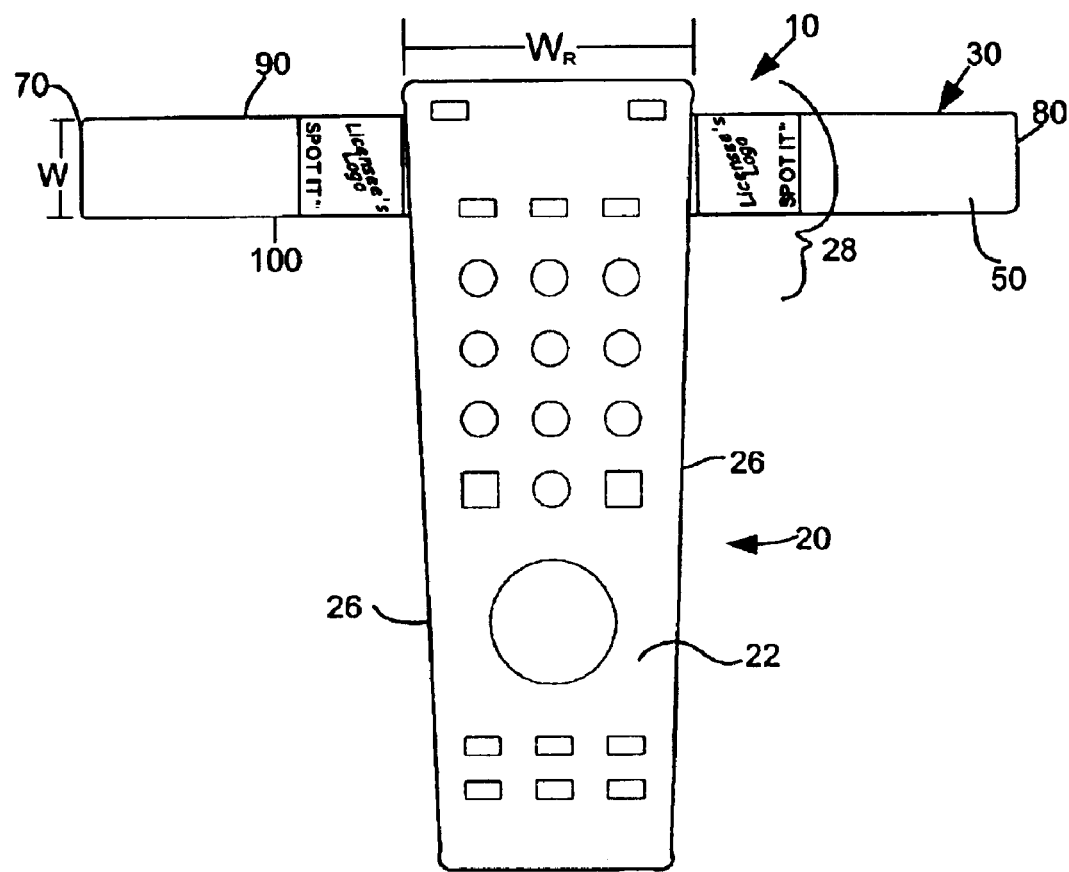
FIG. 1 is a front elevational view of a remote control with an embodiment of the remote control locator attached thereto.
Figure 2:
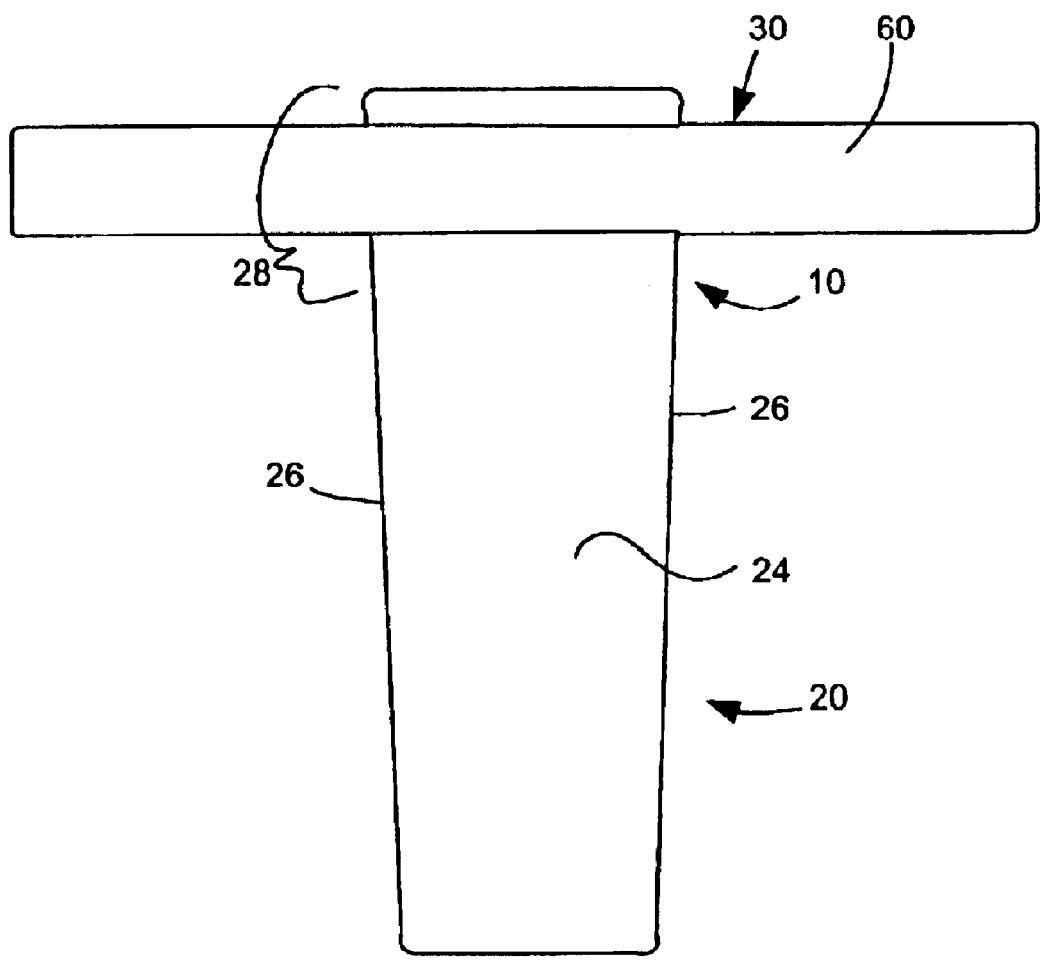
FIG. 2 is a rear elevational view of the remote control and remote control locator illustrated in FIG. 1.
Figure 3:
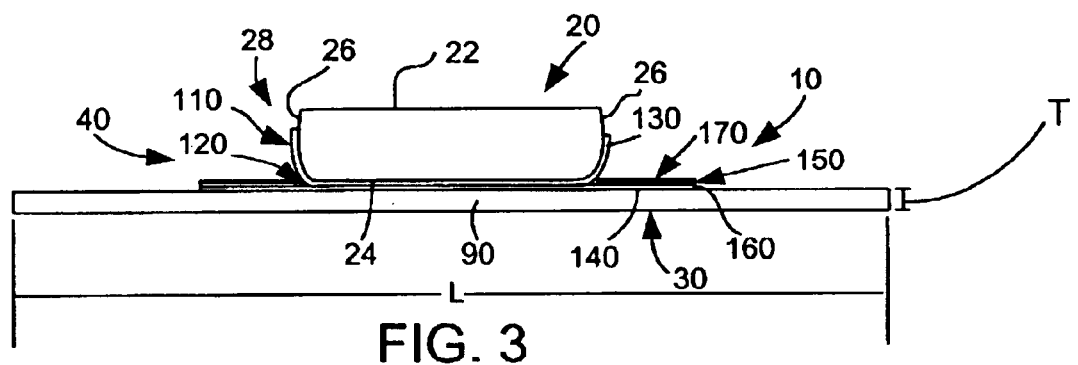
FIG. 3 is a top plan view of the remote control and remote control locator illustrated in FIG. 1.

With reference to FIGS. 1–3, an embodiment of a remote control locator 10 that is attached to a remote control 20 to help a user see and find the remote control 20 will now be described. The remote control 20 includes a front 22, a rear 24, sides 26, and a top end portion 28. As used herein the "top end portion" is the top ¼ of the remote control 20 as shown in FIG. 1. In the top end portion 28, the remote control 20 has a width $W_R$.

The remote control locator 10 includes a wing-shaped body 30 and a mounting assembly 40. In the embodiment shown, the body 30 includes an elongated, thin rectangular block configuration. In alternative embodiments, the body 30 may have elongated, thin configurations other than a rectangular block configuration such as, but not by way of limitation, the body 30 may have a serpentine configuration, a serrated configuration, or a waveform configuration.

The body 30 includes a front surface 50, a rear surface 60, a left end 70, a right end 80, a top edge 90, and a bottom edge 100. The body 30 also includes a width W, a thickness T, and a length L.

The body 30 is preferably made of a plastic material such as, but not by way of limitation, vinyl. The entire exterior surface of the body 30 is preferably a bright, fluorescent, glossy color to make the remote control locator 10 easy to see and find. Exemplary fluorescent colors include, but not by way of limitation, fluorescent orange, fluorescent yellow, fluorescent blue, and fluorescent green. Although the entire exterior surface of the body 30 is preferable a single fluorescent color, one or more of the front surface 50, the rear surface 60, the left end 70, the right end 80, the top edge 90, and the bottom edge 100 may be a fluorescent color, a glow-in-the-dark color, different fluorescent and/or glow-in-the-dark colors.

One or more of the front surface 50, the rear surface 60, the left end 70, the right end 80, the top edge 90, and the bottom edge 100 may include advertising information (e.g., Coca-Cola®, Pop Secret®, 1-888-DOMINOS®, Disney®) or information relevant to the electronic device (or media being provided by electronic device) being controlled (e.g., a channel guide, an information menu, an information table). The advertising information or other information may be added to the body 30 with stickers or any well known printing, etching, or other technique for adding information to substrate.

The body 30 preferably has a single-piece construction, but in alternative embodiments, the body 30 may have a multi-piece construction such as, but not by way of limitation, laminated. Preferably, the length L of the body is at least twice the width $W_R$ of the remote control 20 and no greater than ten times the width $W_R$ of the remote control 20. However, with extremely narrow remote controls 20 and extremely wide remote controls 20, the length L of the body may be outside of this preferred range.

In an alternative embodiment of the body 30, the rear surface 60 of the body 30 may be textured or include a friction material or surface to help prevent the body 30 (and remote control 10) from slipping off of a slippery support surface (e.g., wooden, veneer, vinyl, or leather arm of a chair or couch). One or more rubber feet or stoppers may be placed on the rear surface 60 of the body 30 and/or the rear 24 of the remote control 20 for this same purpose.

The mounting assembly 40 preferable utilizes hook and loop fasteners (e.g., Velcro®) to mount the body 30 to the rear 24 of the remote control 20 in the top end portion 28 of the remote control 20. In the embodiment shown, the mounting assembly 40 includes an remote control fastener strip 110 having an adhesive undersurface and an upper surface with either hook or loop fasteners, and a body fastener strip 120 having an adhesive undersurface and an upper surface with either hook or loop fasteners (the opposite of what is used with the remote control fastener strip 110).

A backing is peeled off the adhesive undersurface of the remote control fastener strip 110, and the adhesive undersurface of the remote control fastener strip 110 is applied to the rear 24 of the remote control 20 in the top end portion 28 of the remote control 20. Ends 130 of the remote control fastener strip 110 are applied to the sides 26 of the remote control 20 to prevent the remote control fastener strip 110 from peeling off the rear 24 of the remote control 20.

A backing is peeled off the adhesive undersurface of the body fastener strip 120, and the adhesive undersurface of the body fastener strip 120 is applied to the front surface 50 of the body 30 in a central portion of the body 30. The body 30 is centered with respect to the remote control 20 and is mounted to the rear 24 of the remote control 20 by attaching the hook or loop fasteners of the body fastener strip 120 to the hook or loop fasteners of the remote control fastener strip 110.

The body fastener strip 120 may include ends 140 that extend laterally of the sides 26 of the remote control 20 when the body 30 is applied to the remote control 20. The hook or loop fasteners on the upper surface of the ends 140 may receive opposite hook or loop fasteners of advertising segments 150. The advertising segments 150 may be comprised of small fastener strips 160 having an adhesive undersurface and an upper surface with either hook or loop fasteners. The hook or loop fasteners of the advertising segments are used to attach the segments 150 to the ends 140. The adhesive undersurface may receive an advertising layer 170 with advertising on an exposed surface. For example, but not by way of limitation, the advertising layer 160 may be a laminated glow-in-the dark paper with a company logo or other advertising on it. The ends 140, segments 150, and advertising layer 160 may be a part of the remote control locator 10, in addition to or as an alternative to the advertising on the body 30.

In alternative embodiments, other types of mounting assemblies other than hook and loop fasteners such as, but not limited to a bracket or mounting frame may be used.

When the remote control locator 10 is applied to the rear 24 and the top end portion 28 of the remote control 20 as described above, the remote control locator 10 forms wings 180 extending laterally from the rear 24 and top end portion 28 of the remote control 20. Not only to the wings 180 help prevent the remote control 20 from falling into crevices or cracks in furniture, but the fluorescent color of the body 30 makes the remote control locator 10 easy to see and, hence, easy to locate the remote control 20.

As described above, the length L of the body is preferably at least twice the width $W_R$ of the remote control 20 and no greater than ten times the width $W_R$ of the remote control 20, providing sufficient surface area on the body 30 for the fluorescent color of the body 30 and any advertising or other information on the body (and/or advertising segments 150 to be easily seen, while not making the body 30 too large or inconvenient for frequent use of the remote control 20.

Another advantage of the wing-shaped body 30 being located on the rear 24 and top end portion 28 of the remote control is that it forms a raised support base for the remote control 20 when the remote control 20 and locator 10 are located on a support surface. The remote control locator 10 causes the top end portion 28 and the remote control locator 10 to be angled up towards the user so than any advertising or other information is easily seen by the user. The base formed by the remote control locator 10 makes the remote control 20 more stable and supported on support surfaces.

Because most users have multiple remote controls for multiple different electronic devices, different color fluorescent remote control locators 10 are used with different remote controls. For example, but not by way of limitation, a fluorescent orange remote control locator 10 may be used with the cable box remote control 20 and a fluorescent yellow remote control locator 10 may be used with a DVD remote control 20.

Figure 4:
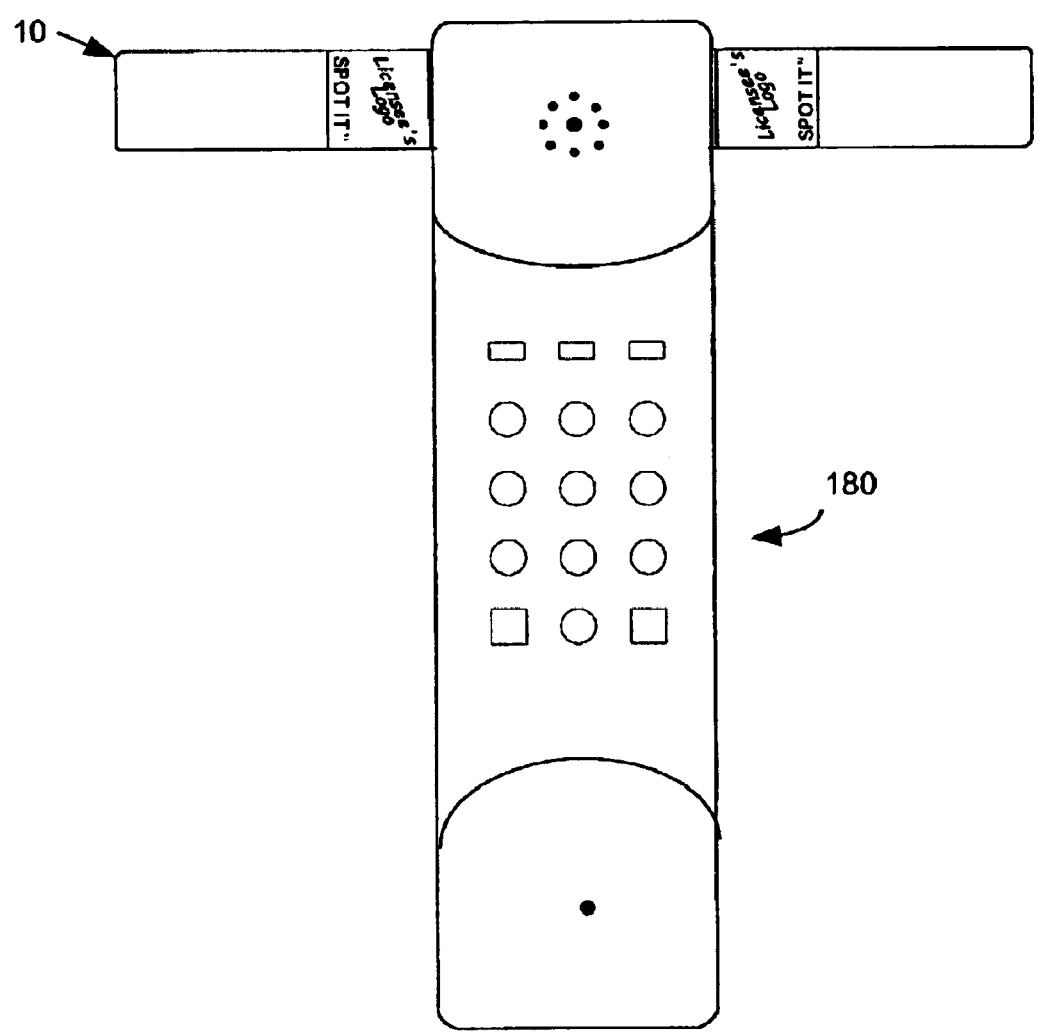
FIG. 4 is a front elevational view of the remote control locator illustrated in FIGS. 1–3 attached to a cordless phone.
Figure 5:
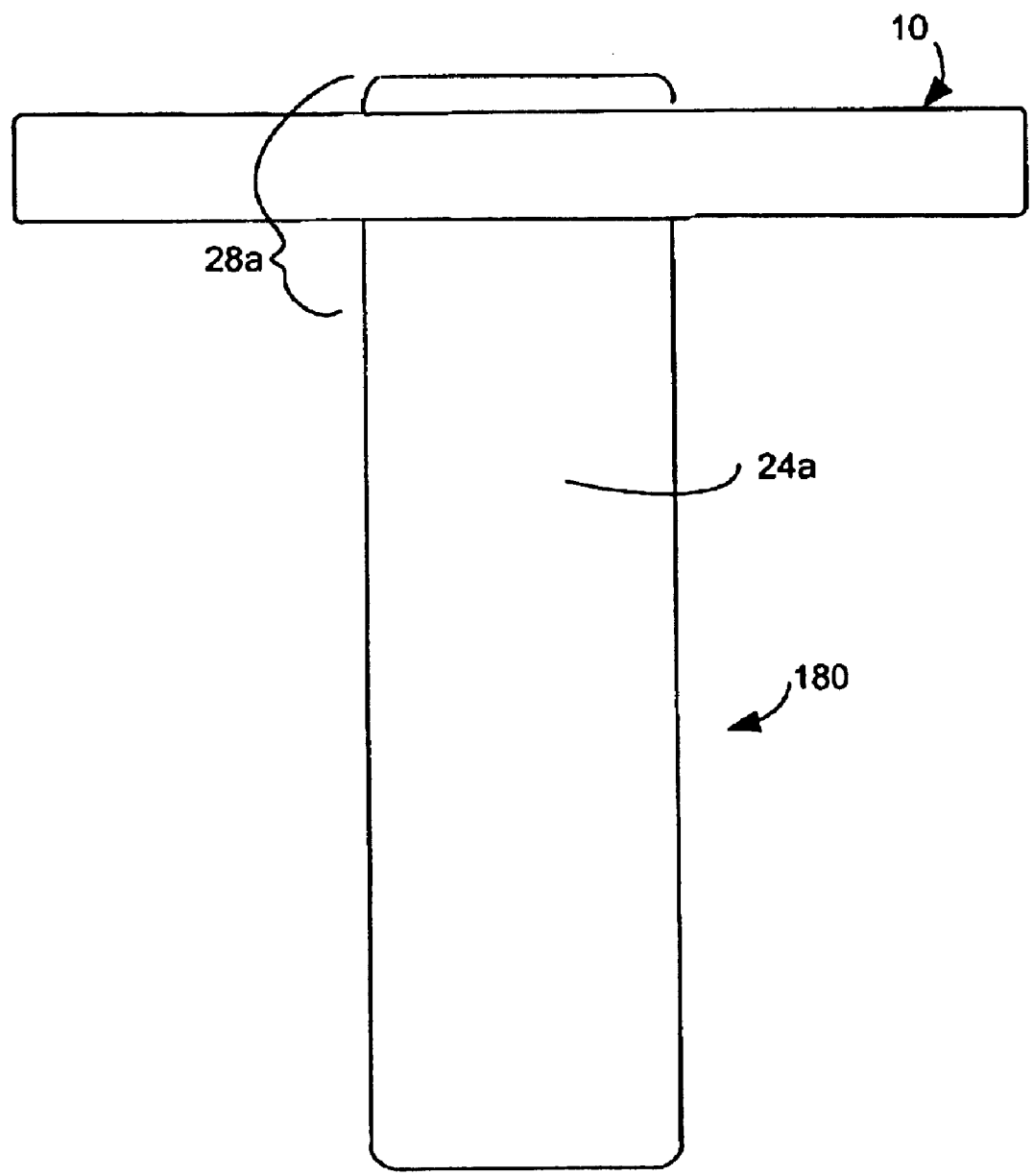
FIG. 5 is a rear elevational view of the remote control locator illustrated in FIG. 4 attached to a cordless phone.
Figure 6:
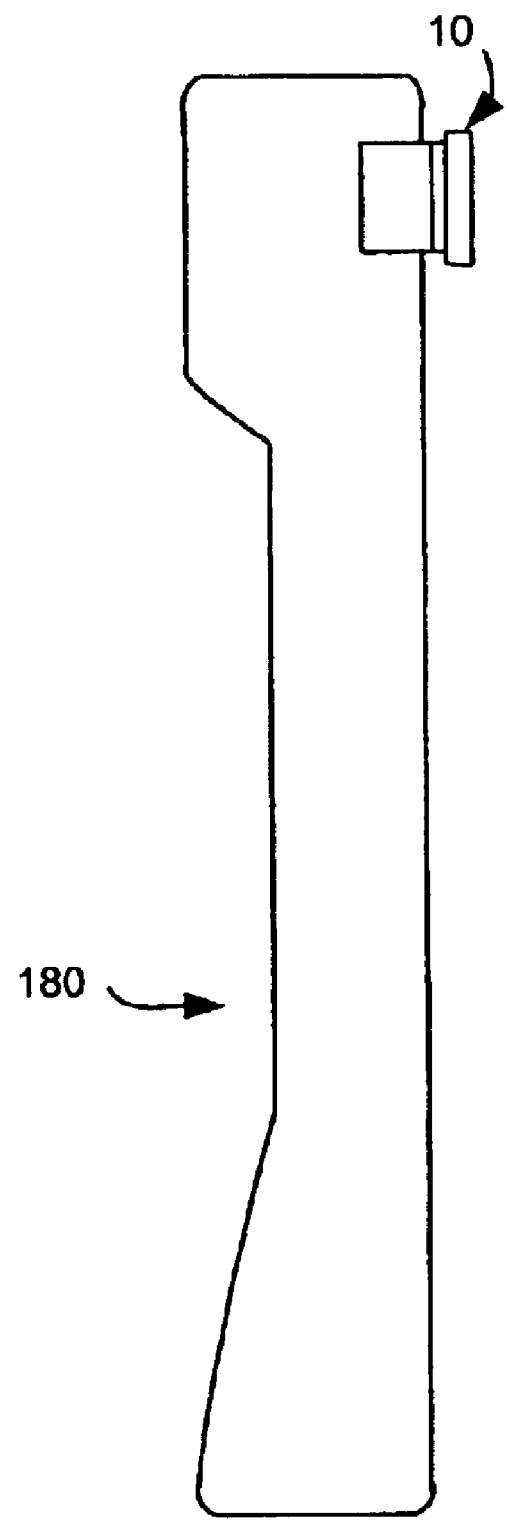
FIG. 6 is a right side elevational view of the remote control locator illustrated in FIG. 4 attached to a cordless phone.

Although the locator 10 has been described as being used with a remote control 20, with reference to FIGS. 4–6, the locator 10 may be mounted to a rear 24a and top end portion 28a of a cordless telephone 180 in a manner similar to that described above with respect to the remote control 20.

While preferred embodiments and methods have been shown and described, it will be apparent to one of ordinary skill in the art that numerous alterations may be made without departing from the spirit or scope of the invention. Therefore, the invention is not limited except in accordance with the following claims.

What is claimed is:

1. A method of using a remote control locator with a remote control, the remote control including a width $W_R$ and a top end portion, the method comprising:

providing a remote control locator including a wing-shaped fluorescent body and a mounting assembly, the wing-shaped fluorescent body including a length L at least twice the width $W_R$ of the remote control and no greater than ten times the width $W_R$;

attaching the wing-shaped fluorescent body only to the top end portion of the remote control using the mounting assembly so that the wing-shaped fluorescent body is centered and extends laterally with respect to the remote control to form opposite lateral fluorescent wings.

2. The method of claim 1, wherein the remote control includes a rear and opposite sides, the mounting assembly includes a remote control fastener strip and a body fastener strip, one of the strips including hook fasteners and the other strip including loop fasteners, and the wing-shaped body includes a front surface with a central portion, the method including adhering the remote control fastener strip to the rear and opposite sides of the remote control in the top end portion, adhering the body fastener strip to the central portion of the upper face of the wing-shaped body, and attaching the wing-shaped fluorescent body to the top end portion of the remote control includes attaching the body fastener strip to the remote control fastener strip.

3. The method of claim 1, wherein the remote control locator includes advertising thereon, and the method further includes advertising to a user of the remote control with the advertising on the remote control locator.

4. The method of claim 3, wherein the remote control locator includes one or more advertising segments removably attachable to the wing-shaped body and including advertising thereon.

5. The method of claim 3, wherein the wing-shaped body includes an exposed surface with the advertising thereon.

6. The method of claim 1, wherein at least part of the remote control locator glows in the dark.

7. The method of claim 1, further including using different color fluorescent remote control locators with different remote controls to distinguish the different remote controls.

8. A method of using a remote control locator with a remote control, the remote control including a width $W_R$, a top end portion, a rear, and opposite sides, the method comprising:

providing a remote control locator including a wing-shaped fluorescent body carrying advertising and a mounting assembly, the wing-shaped fluorescent body including a front surface with a central portion and a length L at least twice the width $W_R$ of the remote control and no greater than ten times the width $W_R$, the mounting assembly including a remote control fastener strip and a body fastener strip, one of the strips including hook fasteners and the other strip including loop fasteners;

adhering the remote control fastener strip to the rear and opposite sides of the remote control in the top end portion;

adhering the body fastener strip to the central portion of the upper face of the wing-shaped body;

attaching the wing-shaped fluorescent body only to the top end portion of the remote control by attaching the body fastener strip to the remote control fastener strip of the mounting assembly so that the wing-shaped fluorescent body is centered and extends laterally with respect to the remote control to form opposite lateral fluorescent wings;

advertising to a user of the remote control with the advertising carried by the wing-shaped fluorescent body.

9. The method of claim 8, wherein the remote control locator includes one or more advertising segments removably attachable to the wing-shaped body and including the advertising thereon.

10. The method of claim 8, wherein the wing-shaped body includes an exposed surface with the advertising thereon.

11. The method of claim 8, wherein at least part of the remote control locator glows in the dark.

12. The method of claim 8, further including using different color fluorescent remote control locators with different remote controls to distinguish the different remote controls.

\* \* \* \* \*